United States Patent [19]
Nielsen

[11] Patent Number: 5,925,106
[45] Date of Patent: Jul. 20, 1999

[54] METHOD AND APPARATUS FOR OBTAINING AND DISPLAYING NETWORK SERVER INFORMATION

[75] Inventor: Jakob Nielsen, Atherton, Calif.

[73] Assignee: Sun Microsystems, Inc., Mountain View, Calif.

[21] Appl. No.: 08/628,418

[22] Filed: Apr. 5, 1996

[51] Int. Cl.$^6$ .................................................. H04N 1/00
[52] U.S. Cl. ........................................ 709/247; 707/513
[58] Field of Search .................. 395/200.33, 200.49, 395/200.57, 200.8, 968, 200.47, 200.61, 200.68; 707/3, 9, 10, 501, 513

[56] References Cited

U.S. PATENT DOCUMENTS

| | | | |
|---|---|---|---|
| 5,617,540 | 4/1997 | Civanlar et al. | 395/200.57 |
| 5,664,185 | 9/1997 | Landfield et al. | 395/615 |

OTHER PUBLICATIONS

Hypertext Transfer Protocol–HTTP/1.0, by T. Berners–Lee, MIT/LCS, R. Fielding, UC Irvine, H. Frystyk, MIT/LCS, HTTP Working Group, Feb. 19, 1996.

Uniform Resource Locators (URL), by T. Berners–Lee, CERN, L. Masinter, Xerox Corporation, M. McCahill, University of MInnesota, Editors, Dec., 1994, Network Working Group, RFC 1738, pp. 1–24.

Hypertext Transfer Protocol–HTTP/1.1, by R. Fielding, UC Irvine, H. Frystyk, MIT/LCS, T. Berners–Lee, MIT/LCS, HTTP Working Group, Jan. 19, 1996,47 Pages.

Instant HTML Web Pages, by Wayne Ause, ISBN 1–56276–363–6, Chapter 1, pp. 1–15.

*Primary Examiner*—Thomas Peeso
*Attorney, Agent, or Firm*—Daniel B. Curtis

[57] ABSTRACT

Apparatus, methods, and computer program products are disclosed to simplify a computer user's navigation through a distributed information space. The invention provides the computer user with information identifying the server that provides access to data (or to services) of interest to the user.

39 Claims, 14 Drawing Sheets

METHOD AND APPARATUS FOR OBTAINING AND DISPLAYING NETWORK SERVER INFORMATION

BACKGROUND OF THE INVENTION

FIELD OF THE INVENTION

This invention relates to the capabilities of information access apparatus and information provider apparatus; and the methods and computer programming products that are used to implement them. A prime example of an information access apparatus is a computer using a WWW browser application. A prime example of an information provider apparatus is a computer using a WWW server program. Specifically, this invention is a new and useful method, apparatus and computer program product for presenting human-friendly server identification information to a user to better indicate the origin of the information.

BACKGROUND

The background of the World Wide Web (WWW), WWW browsers, and Uniform Resource Locators (URL) are well described by reference to the first chapter of Instant HTML Web Pages, by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC-1738 that can be found on the WWW at:

"http://www.w3.org/hypertext/WWW/Addressing/rfc1738.txt"

Although the invention covers information access and information provider apparatus, WWW browser and WWW server applications are representative of the technology. As such, the majority of this application describes the invention within the context of a preferred embodiment utilizing WWW browser and WWW server applications. A WWW browser communicates with a WWW server using the HyperText Transfer Protocol (HTTP). This protocol continues to evolve and, although heavily used, the document describing it is considered a draft document. The HTTP/1.0 draft document of Feb. 19, 1996 and the HTTP/1.1 draft document of Jan. 19, 1996 are incorporated by reference as illustrative of the prior art.

The WWW is a massive HyperText system. WWW users often become disoriented while navigating through the WWW. One reason for this disorientation is that the WWW initially appears to have little structure. The structure that does exist comes from the fact that the information accessible via the WWW exists on a specific server. That is, each WWW page (webpage) is stored on a specific server. In the prior art, this connection between server and information is not clearly indicated.

WWW sites (websites) are accessed through use of their domain names (e.g., www.sun.com) or IP address (e.g., 45.212.23.1). Domain names are requested by the maintainers of the website and are approved by a third party. These addresses and domain names must be unique. Sometimes the domain name is sufficiently descriptive as to describe the WWW site. Often however, the domain name is either not descriptive or misdescriptive of the site. For example does www.sun.com refer to the SUN OIL company or to SUN MICROSYSTEMS, Inc.? IP addresses carry no descriptive value whatsoever.

The domain name is embedded in the URL. For example in:

http://www.sun.com/index.html the "www.sun.com" is the domain name for the server. Even if the domain name is unambiguous, its placement in the URL is intimidating to inexperienced users of the WWW.

This situation obscures the information structure of the web because the domain name of the server provides insufficient information about the server to accurately identify the organization that provides the server. WWW browser users need to have access to information about a server to better understand the information structure of the WWW. That is, the connection between server and information residing on the server must be clear. Further, the maintainer of a server would like to be able to display data that describes the server to the user of a WWW browser. This can be accomplished by displaying, for the example above:

http://www.sun.com/index.html (Sun Microsystems, Inc. WWW Server)

With the server's identification data appended to the URL, the connection between the server and the information it provides is clearly indicated. Thus, a WWW user knows more about the informational structure of the WWW.

SUMMARY OF THE INVENTION

The present invention overcomes the disadvantages of the above described systems and provides an economical, high performance, apparatus, method, and computer program product for providing server-specific identification information to a computer user. One aspect of the invention is a computer controlled method for obtaining server identification data, by using a domain name, and displaying this data on a display device. The server identification data includes descriptive information about the server identified by the domain name.

In another aspect of the invention, an apparatus for accessing information on a network is disclosed. This apparatus includes an access mechanism that uses a domain name to obtain server identification data. This apparatus also includes a mechanism to display the server identification data. The server identification data includes descriptive information about the server identified by the domain name.

Yet another aspect of the invention is a computer program product on a computer usable medium for causing a computer to access and display server identification data. The server identification data includes descriptive information about the server identified by the domain name.

Another aspect of the invention is a computer controlled method for providing server identification data over a network Using this method the server identification data is resident on and provided by the server and the server is specified by a domain name.

In another aspect of the invention, a server apparatus responsive to a domain name is disclosed. This server apparatus includes a server identification mechanism that provides server identification data about the server over a network.

Yet a final aspect of the invention is a computer program product on a computer usable medium for causing a computer to provide server identification data.

DESCRIPTION OF THE DRAWINGS

The objects, features and advantages of the system of the present invention will be apparent from the following description in which.

NOTATIONS AND NOMENCLATURE

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer when executing computer instructions are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable medium encoded with either an information access application such as a WWW browser or an information provider application such as a WWW server or both.

DESCRIPTION OF THE PREFERRED EMBODIMENTS

Although the invention covers information access and information provider apparatus, methods, and computer program products, WWW browser and WWW server apparatus and applications are representative of the technology. As such, a preferred embodiment utilizing WWW browser and WWW server applications is described.

Operating Environment

Figure 1:
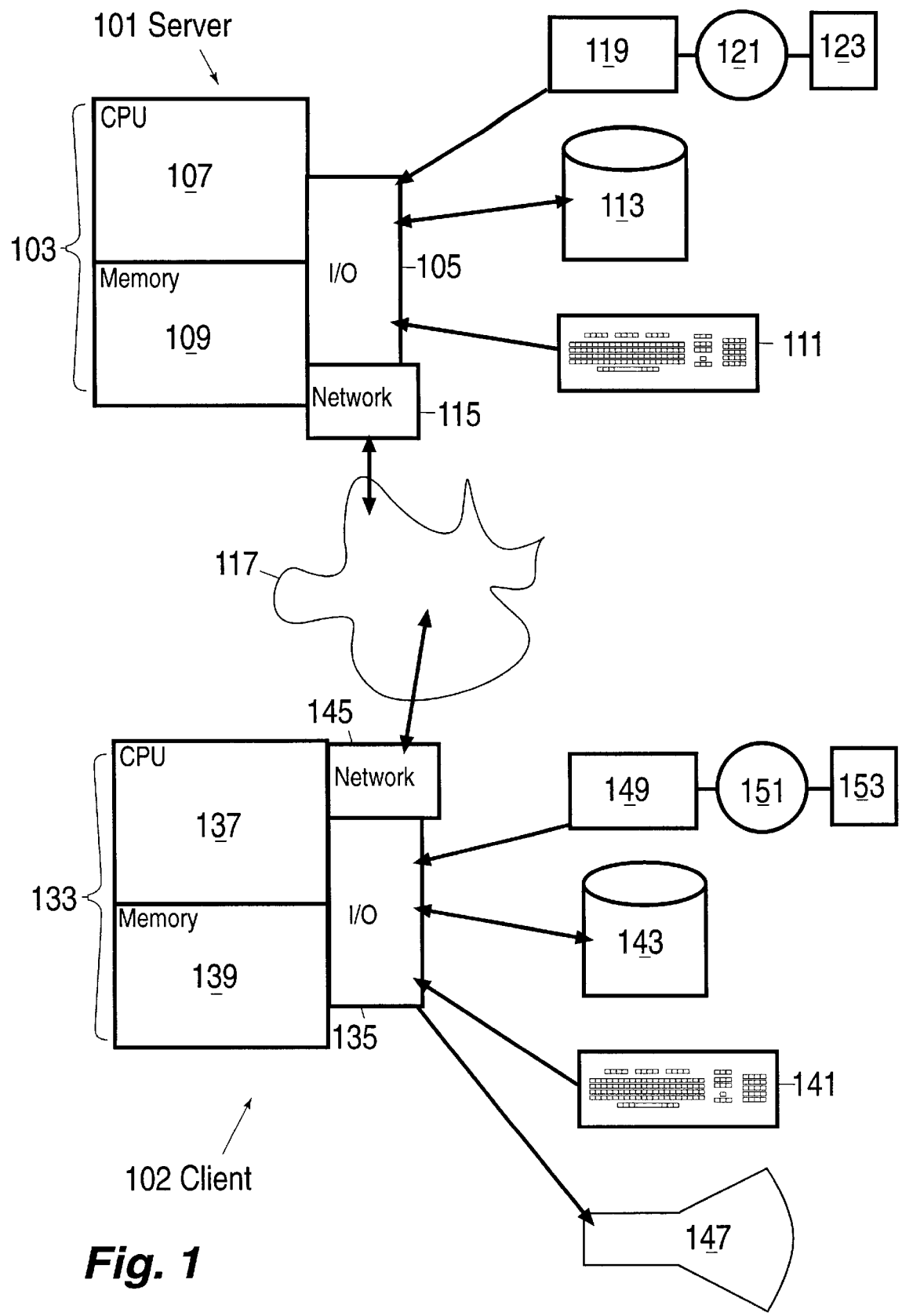
FIG. 1 illustrates the components of a client computer and server computer in accordance with a preferred embodiment.

The invention is used with computer systems. The server computer system 101 is configured to support a World Wide Web (WWW) server application. The client computer system 102 is configured to support a WWW browser application. Some of the elements of the server computer system 101 are shown in FIG. 1, wherein a processor 103 is shown, having an Input/Output ("I/O") section 105, a central processing unit ("CPU") 107 and a memory section 109. The I/O section 105 is connected to a keyboard 111, a disk storage unit 113, a network interface 115 to provide access to a network 117 and a CD-ROM drive unit 119. The CD-ROM unit 119 can read a CD-ROM medium 121 that typically contains programs 123 and data. The CD-ROM 117 and the disk storage unit 113 comprising a filestorage mechanism containing information available for network access. Such a computer system is capable of executing World Wide Web (WWW) server applications that embody the invention.

Some of the elements the client computer 102 configured to support a WWW browser application are also shown in FIG. 1 wherein a processor 133 is shown, having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147 and a CD-ROM drive unit 149. The CD-ROM unit 149 can read a CD-ROM medium 151 that typically contains programs 153 and data. The CD-ROM 117 and the disk storage unit 113 comprising a filestorage mechanism. Such a computer system is capable of executing WWW browser applications that embody the invention.

Figure 2:
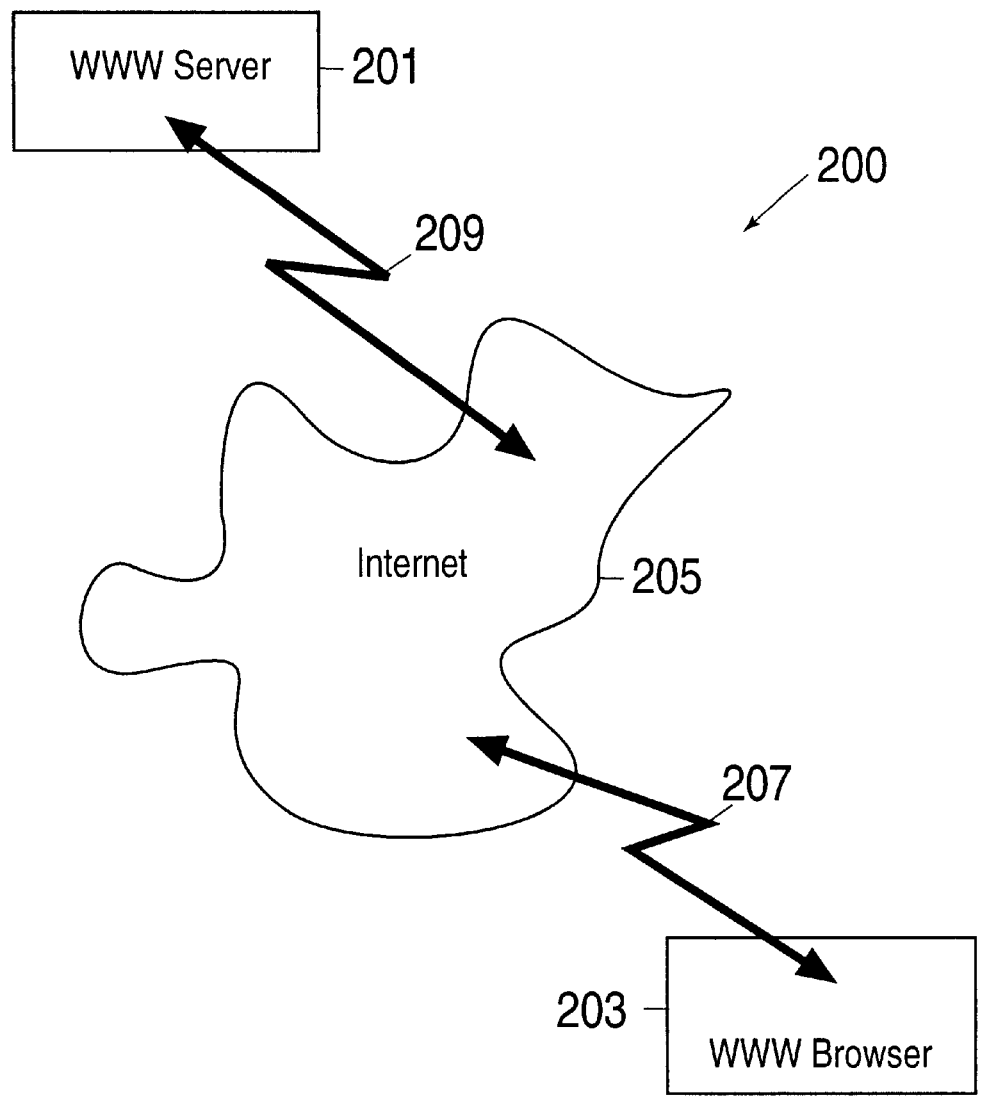
FIG. 2 illustrates the relationship between a browser application, an information server application and the Internet as is well known in the prior art.

FIG. 2 illustrates the fundamental characteristics of the WWW 200. An information provider apparatus (generally a computer executing a WWW server application) 201 provides access to information on request by an information access apparatus (generally a computer executing a WWW browser application) 203. The WWW server 201 and WWW browser 203 generally open a reliable communication channel 207, 209 over the Internet 205 using an error correcting Internet protocol such as TCP/IP. Once the connection between the WWW server application 201 and the browser application 203 is established, the applications communicate using a HyperText Transfer Protocol (HTTP). The WWW server application 201 generally responds to commands from the WWW browser application 203 to provide services and information (data) to the WWW browser application 203. One skilled in the art will understand that both the WWW server application 201 and the WWW browser application 203 can be executing on the same computer and that the TCP/IP connections 207, 209 between the applications need not actually be made across the Internet 205.

Figure 3A:
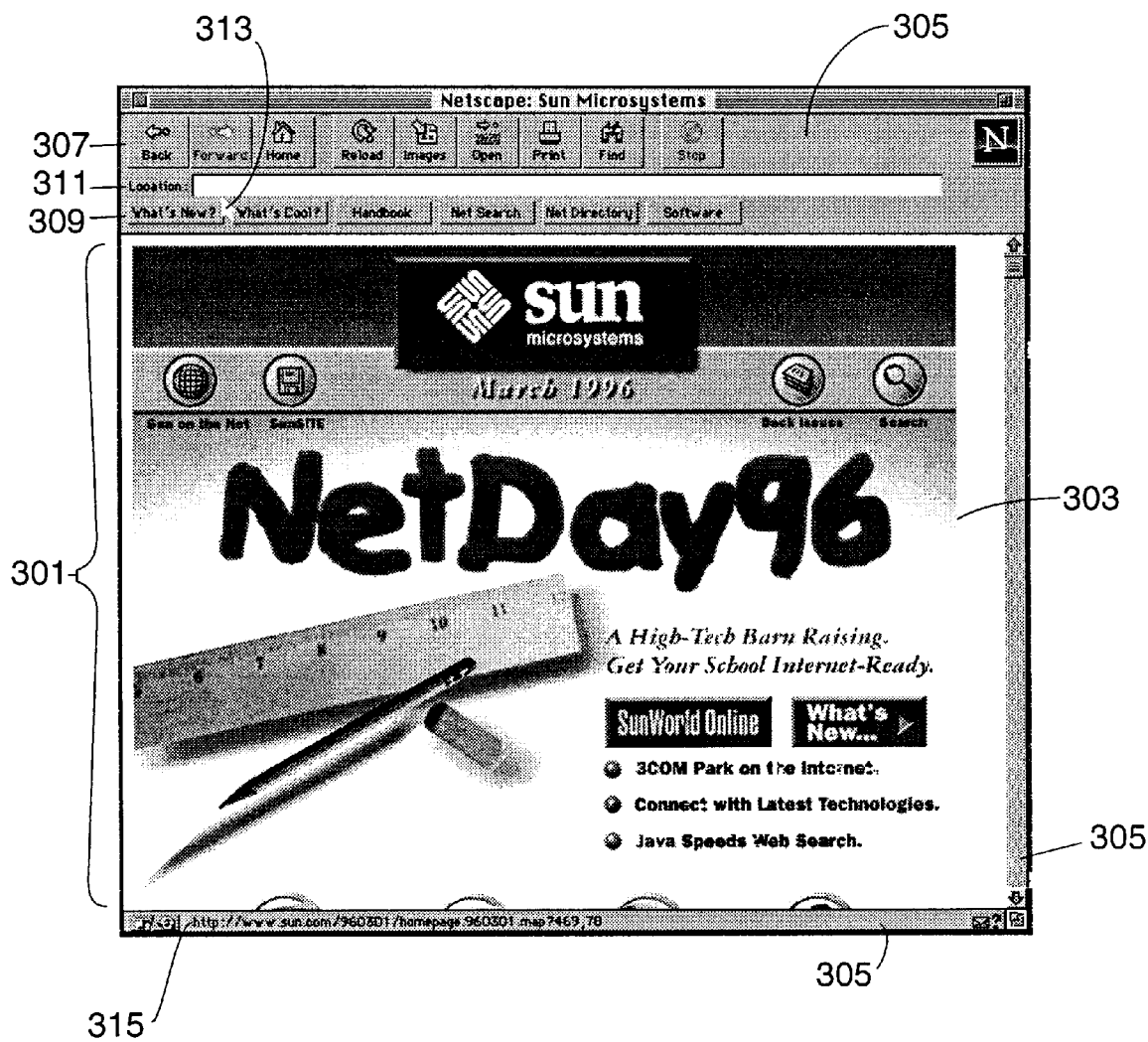
FIG. 3A is a scanned image that illustrates a prior art display of a webpage using a WWW browser application.

FIG. 3A illustrates a webpage provided by a WWW server apparatus executing a WWW server application as viewed on a display device using the display mechanism within the WWW browser application 203. This browser application is provided by Netscape Communications, Inc. This Netscape browser application is one of many possible WWW browser applications that would be improved by the incorporation of the invention therein. The webpage information 301 is displayed in a window 303 framed 305 by the Netscape browser application 203. This browser application 203 provides operator command buttons 307, WWW navigation buttons 309, presents the URL for the currently displayed webpage 311, and an anchor indicator showing what part of the webpage could be evoked by activation of a pointing device (the pointing device is not shown). In this figure, the pointing device icon is an arrowhead 313 and the anchor URL selected by the arrowhead 313 is displayed at the location labeled 315.

Figure 3B:
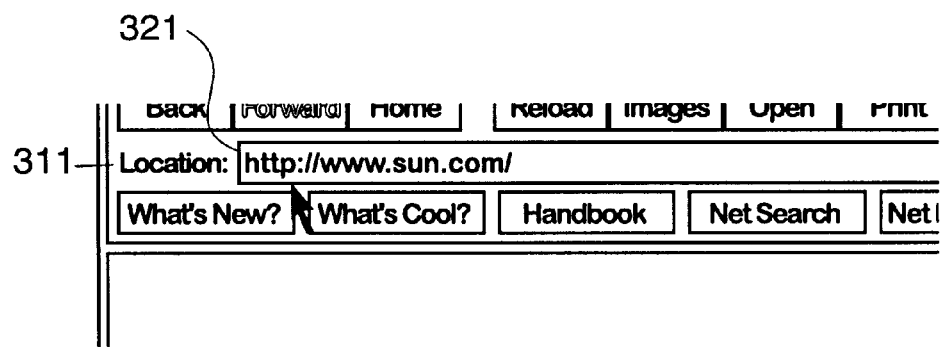
FIG. 3B illustrates a prior art display of a URL addressing the webpage illustrated in FIG. 3A.
Figure 3C:
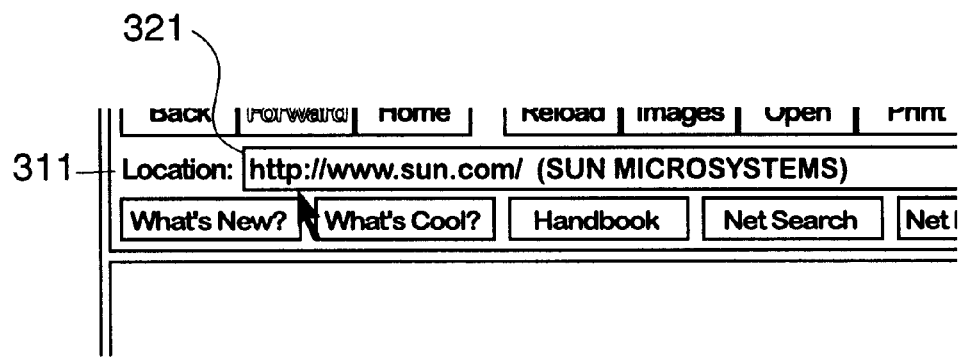
FIG. 3C illustrates a display of a URL and server's identification data in accordance with a preferred embodiment.

FIG. 3B is a magnified view of the area labeled 311 in FIG. 3A. This illustration shows the URL 321 that references the displayed webpage. The "http:" indicates that the webpage is accessed using the HyperText Transfer Protocol. The "www.sun.com" is the domain name of the webpage. Compare FIG. 3B with FIG. 3C. Using the invention, the text displayed 321 in the location field 311 now includes the server's identification data. In this instance, the server's identification data includes the text string "SUN MICROSYSTEMS" as descriptive information. The server's identification data is enclosed in parentheses "( )" and separated from the URL by a space. Because URL processing terminates upon encountering "unsafe characters" such as the space character, the operation resulting from the transmission of the modified URL is not affected by the server's identification data. In a preferred embodiment, if the user were to edit the URL and thus break the association between the server's domain name and the server's identification data, the application would remove the server's identification data from the string because it would no longer reflect the modified URL.

Figure 4A:
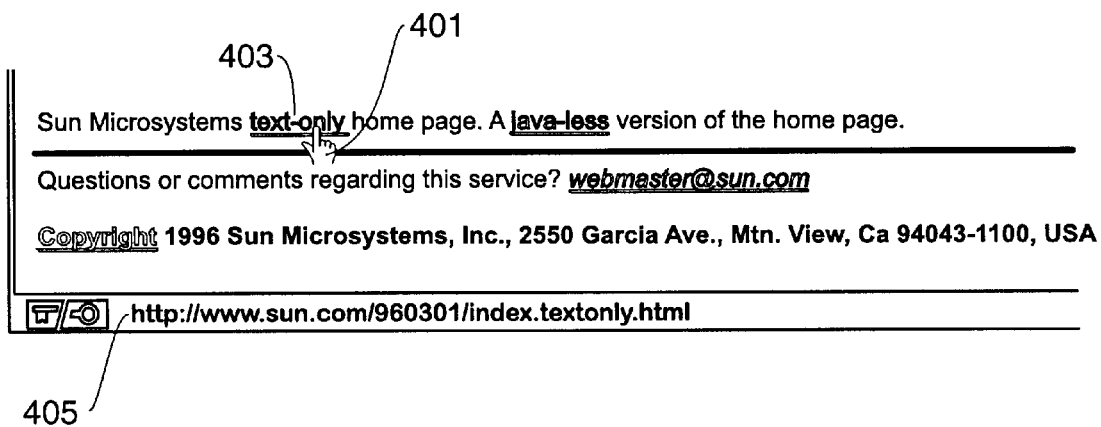
FIG. 4A illustrates a prior art display of a URL corresponding to a HyperText link embedded in a webpage.
Figure 4B:
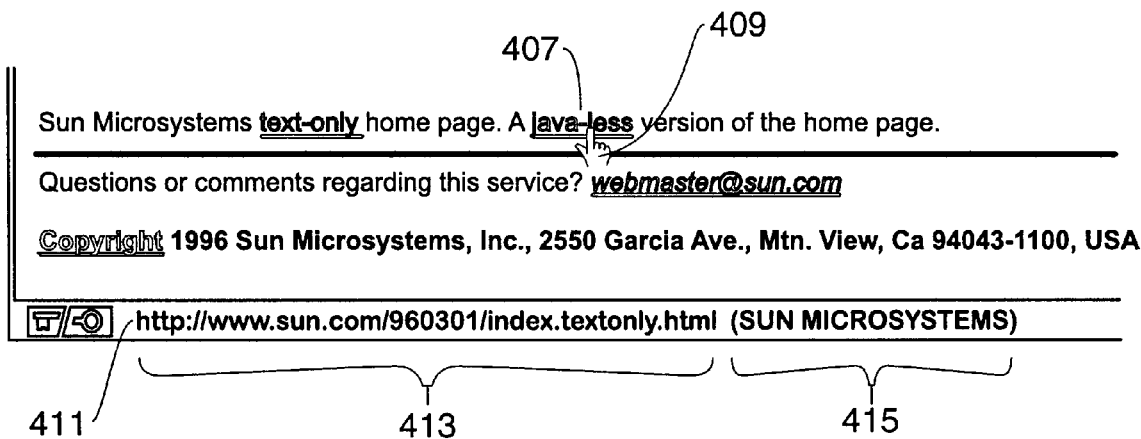
FIG. 4B illustrates a display of a URL and server's identification data corresponding to a HyperText link embedded in a webpage in accordance with a preferred embodiment.

FIGS. 4A and 4B illustrate the use of the invention with HyperText links. FIG. 4A indicates the prior art method. When the user positions the pointing icon 401 over a HyperText link 403 the URL associated with that link is displayed at the location labeled 405. FIG. 4B illustrates the display presented to the user when the invention is incorporated within a WWW browser. Again, the user positions the pointing icon 409 over a HyperText link 407. Now, the URL 413 and the server's identification data 415 are both displayed at the location labeled 411. Because the server identification data allows a WWW browser to display whatever data the server site determines to best identify the site to a user, the user is better able to understand the organization of data accessible via the WWW.

Figure 4C:
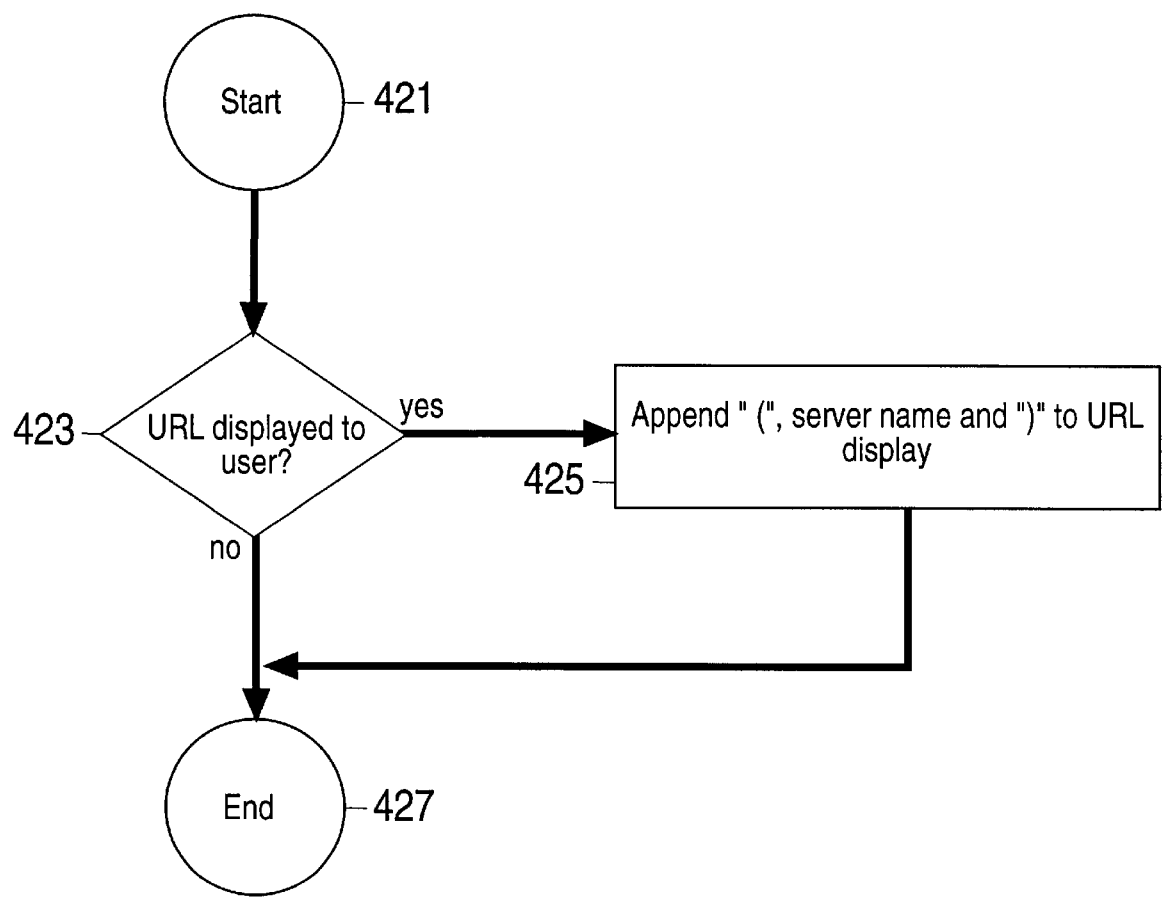
FIG. 4C illustrates the process for modifying the URL to display the server's identification data in accordance with a preferred embodiment.

FIG. 4C illustrates how the WWW browser adds the server's identification data to the associated URL. After a webpage is downloaded to the browser, the browser examines each URL in the page. Each URL in the webpage is processed starting at the terminal block labeled 421. If the URL is not displayed to the user 423, the process completes through the terminal labeled 427. If the URL is displayed to the user 423, the process 425 appends a space, an open parentheses "(", the server identification data, and a closing parentheses ")" to the URL display and again completes through the terminal labeled 427.

The invention is also used to append a server's identification data to the bookmark facility of WWW browsers. The bookmark facility allows a user to capture and store URLs of interest. This allows the user to directly access the associated webpage without requiring the user to remember the URL or to repeat a search procedure to find the webpage of interest. Generally the bookmark contains the URL and the webpage title. The bookmark facility displays the webpage title. Using the invention, the server's identification data is appended to the display of the webpage title in the same manner as for URLs.

Figure 5:
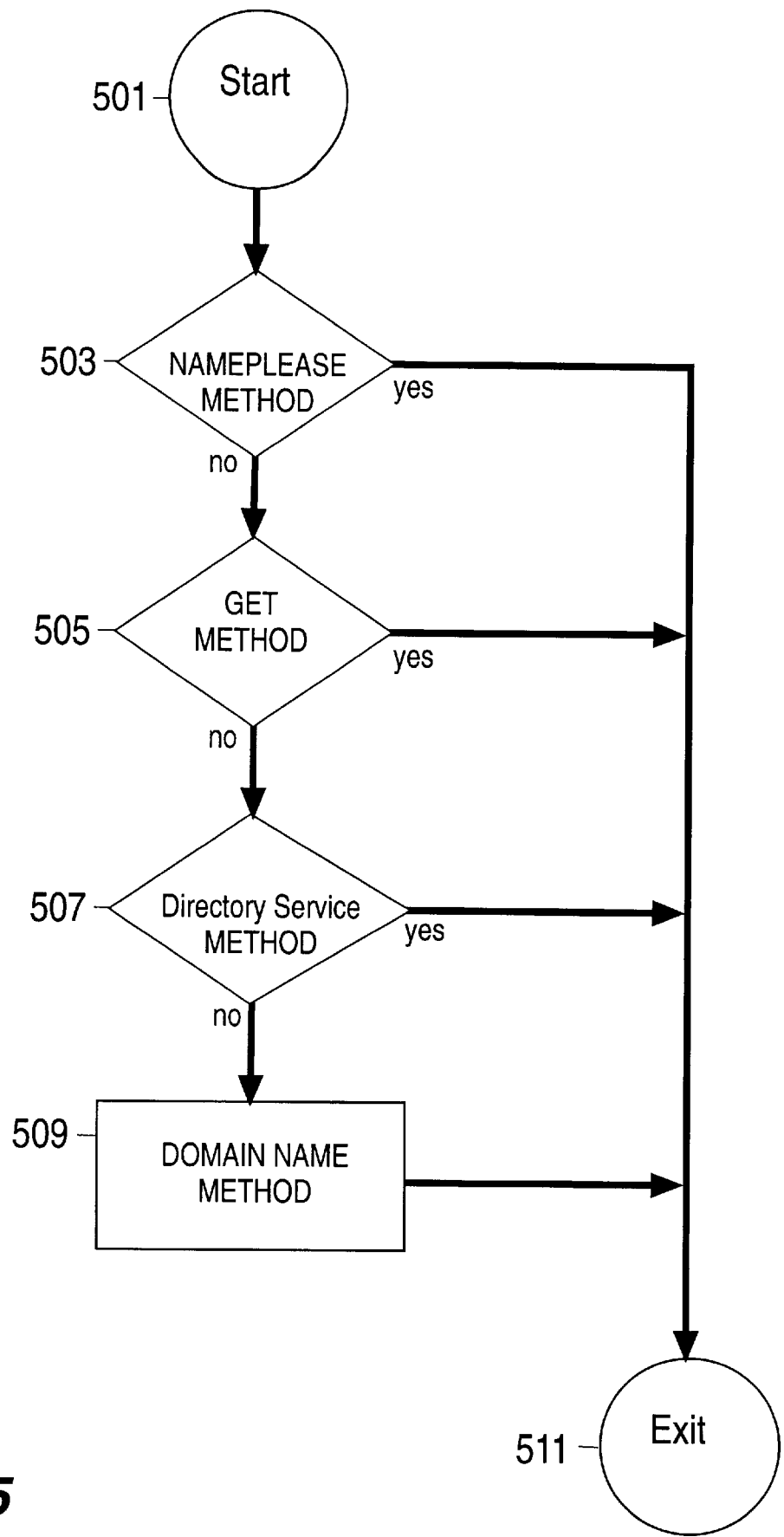
FIG. 5 illustrates the process for obtaining the server's identification data in accordance with a preferred embodiment.

FIG. 5 illustrates the process performed by an information access apparatus using an access mechanism to obtain server identification data. Here, a WWW browser utilizing a preferred embodiment of the invention queries the WWW server for the server's identification data. At this point, as is known in prior art, the browser and server have established a reliable connection. The server and browser communicate using HTTP over this connection. At this point, the WWW browser is in communication with the server identification mechanism in the server computer. The query mechanism process for the WWW browser to obtain the server identification data starts at the terminal labeled 501. The browser first attempts 503 to obtain the server's identification data by sending query request (a HTTP NAMEPLEASE message) to the server. Those skilled in the art will recognize that this HTTP message is an extension to the existing HyperText Transfer Protocols. This message consists of the nameplease string "NAMEPLEASE" followed by a line terminator. If the query recognition mechanism within the server recognizes the message, as described below, the server's response mechanism responds with a success message followed by the server's identification data in accordance with the HyperText Transfer Protocol. This response is received by the WWW browser's receiver mechanism. In this situation, the process completes through the exit terminal 511. On the other hand, if the server did not recognize the NAMEPLEASE HTTP message or if the server does not respond within some period of time the browser attempts to obtain the server's identification data by using the well known GET HTTP message 505. This process is also described below. Again, if the server either responds with an error or does not respond within some time-out period the browser will make yet a third attempt using an Internet directory service process 507 (again described below). Finally, if none of the above processes complete successfully, the browser uses 509 the server's domain name as the server's identification data. This process results in the WWW browser obtaining a server's identification data for later display to the user.

In one embodiment of the invention, the delay times mentioned above are on the order of ten seconds. The actual delay times should be set short enough so that the user of the browser does not become impatient while waiting for a response, but long enough to allow the server to respond under normal network and server loading. Those skilled in the art will recognize that the invention is practiced using a wide range of delay time values.

In a preferred embodiment, the process described above also adapts to delayed responses from previous attempts. For example, if the GET message 505 attempt has started because of the delay time-out for the NAMEPLEASE method 503 expired, but the WWW browser then receives a response to the NAMEPLEASE message, the NAMEPLEASE response is used and the GET attempt is abandoned.

Figure 6:
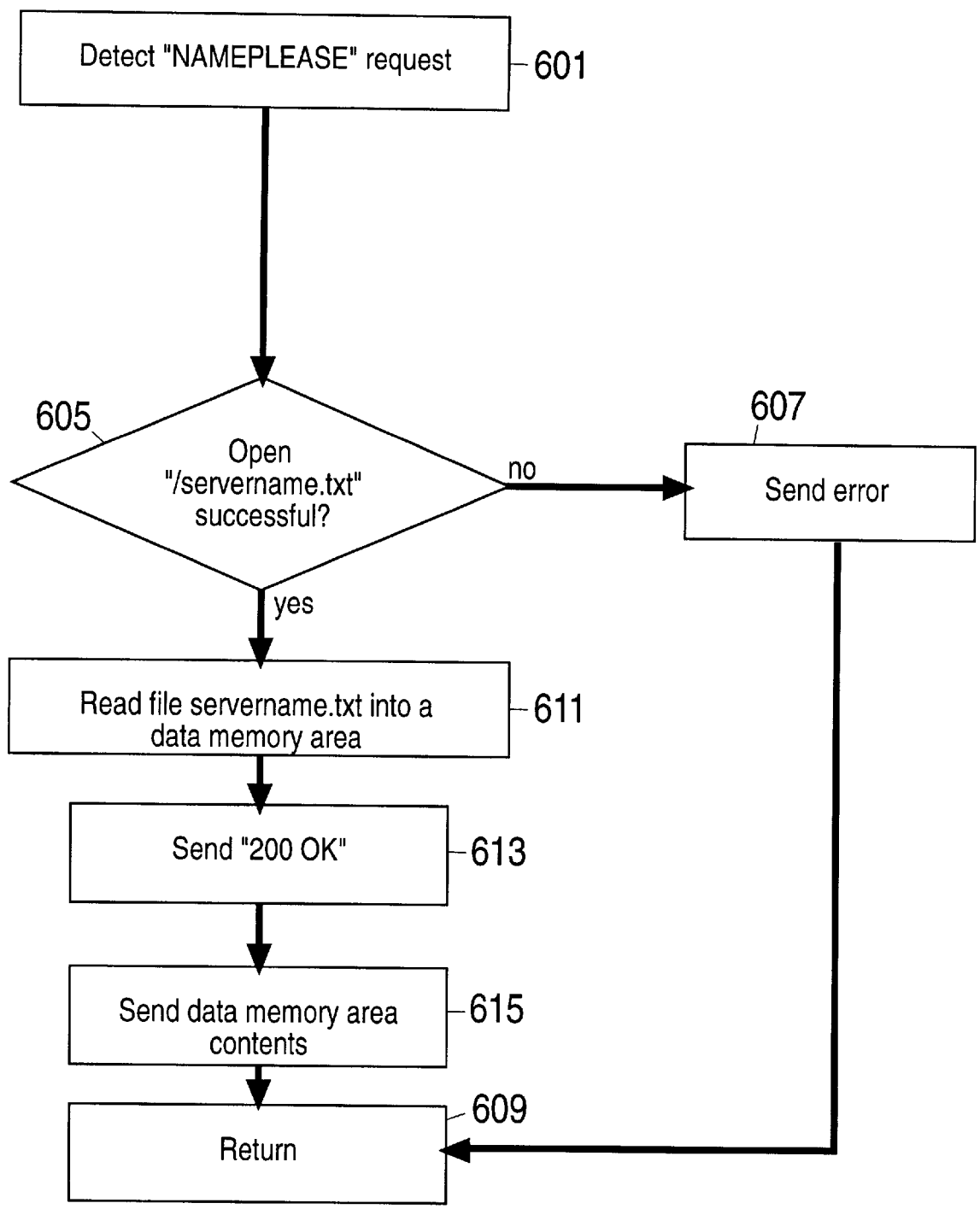
FIG. 6 illustrates the server's response to the "NAME-PLEASE" HTTP extension in accordance with a preferred embodiment.

FIG. 6 illustrates the process a server identification mechanism within the server uses when responding to a NAMEPLEASE HTTP request message. The server first detects the "NAMEPLEASE" request message 601. The server then attempts to open and read a particular file residing on the server's filesystem 605. This file contains the server's identification data. In a preferred embodiment, this file is named "/servername. txt". If this file was not successfully opened and read, an en-or message is sent to the WWW browser 607 and the process returns 609. On the other hand, if the file opens successfully, the file contents are read 611 into a data memory area. Next 613, the server constructs a standard HTTP response message the indication for success "200 OK" followed 615 by a line terminator and the contents of the file that were read into the data memory area. Finally the process returns 609. Those skilled in the art will recognize that the success status message is of the form 2xx where the xx provide additional information about the successful operation. Thus, a preferred embodiment will detect success to any 2xx response.

If the NAMEPLEASE method descried above does not obtain the server's identification data, the WWW browser then attempts to directly read the contents of the server's identification data file 505. Using methods well understood in the art, the browser sends the message:

"GET http://domainna-me/servername.txt HTTP/1.0"
where "domainname" is a standard Internet domain name such as "www.sun.com". The filename string is "servername.txt" in a preferred embodiment. This GET command message returns the server's identification data contained in the specified file to the WWW browser. This file is the same file that is accessed for the NAMEPLEASE process described above. The server's identification data is contained in the first line of the entity-body portion of the HTTP response.

If neither the NAMEPLEASE method 503 nor the GET method 505 succeed in obtaining a server's identification data, the browser attempts the network directory service method 507. A network directory access mechanism utilizes any network directory service, available to the browser computer, to access the network directory service to retrieve a textual description associated with the domain name. One preferred embodiment utilizes the UNIX "who is" utility. Another preferred embodiment uses similar a X.500 application to access an Internet name server. If the directory service method unsuccessful, the process simply returns the domain name as the server identification data.

Figure 7:
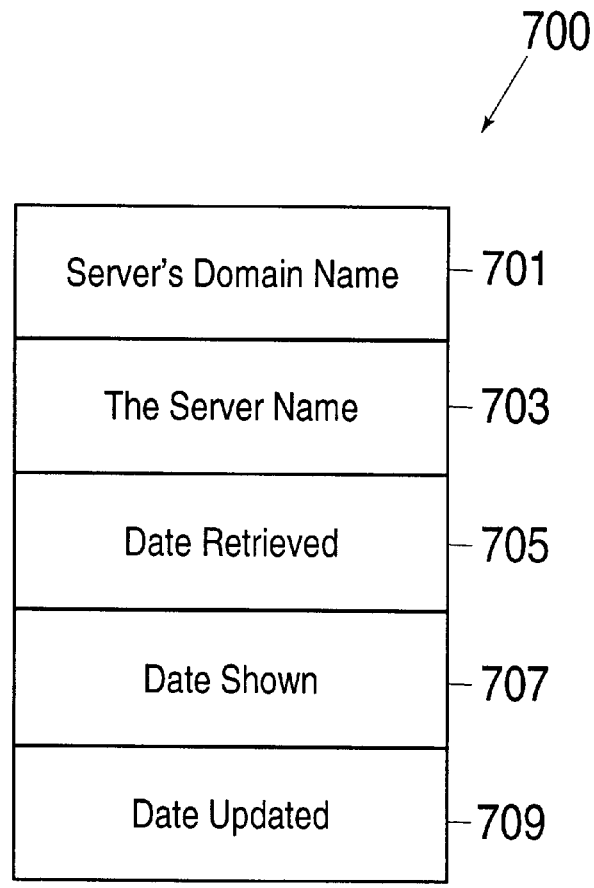
FIG. 7 illustrates the contents of a data record contained in the database used to associate URLs with server identification data in accordance with a preferred embodiment.

A preferred embodiment of a WWW browser includes a database access mechanism that maintains a database containing a record that associates the server's domain name with the server's identification data. The format of the records in this data base is illustrated in FIG. 7. The record 700 contains the server's domain name 701, the server's identification data 703, and three date fields 705, 707, and 709. The Date Retrieved field 705 contains the date when the server's identification data was last retrieved. The Date Shown field 707 contains the date when the server's identification data was last shown to a user. The Date Updated field 709 contains the date of the last attempt to update the server's identification data. One skilled in the art will recognize the invention contemplates that the internal structure of the record 700 may be organized in many different ways and with different data fields.

Figure 8:
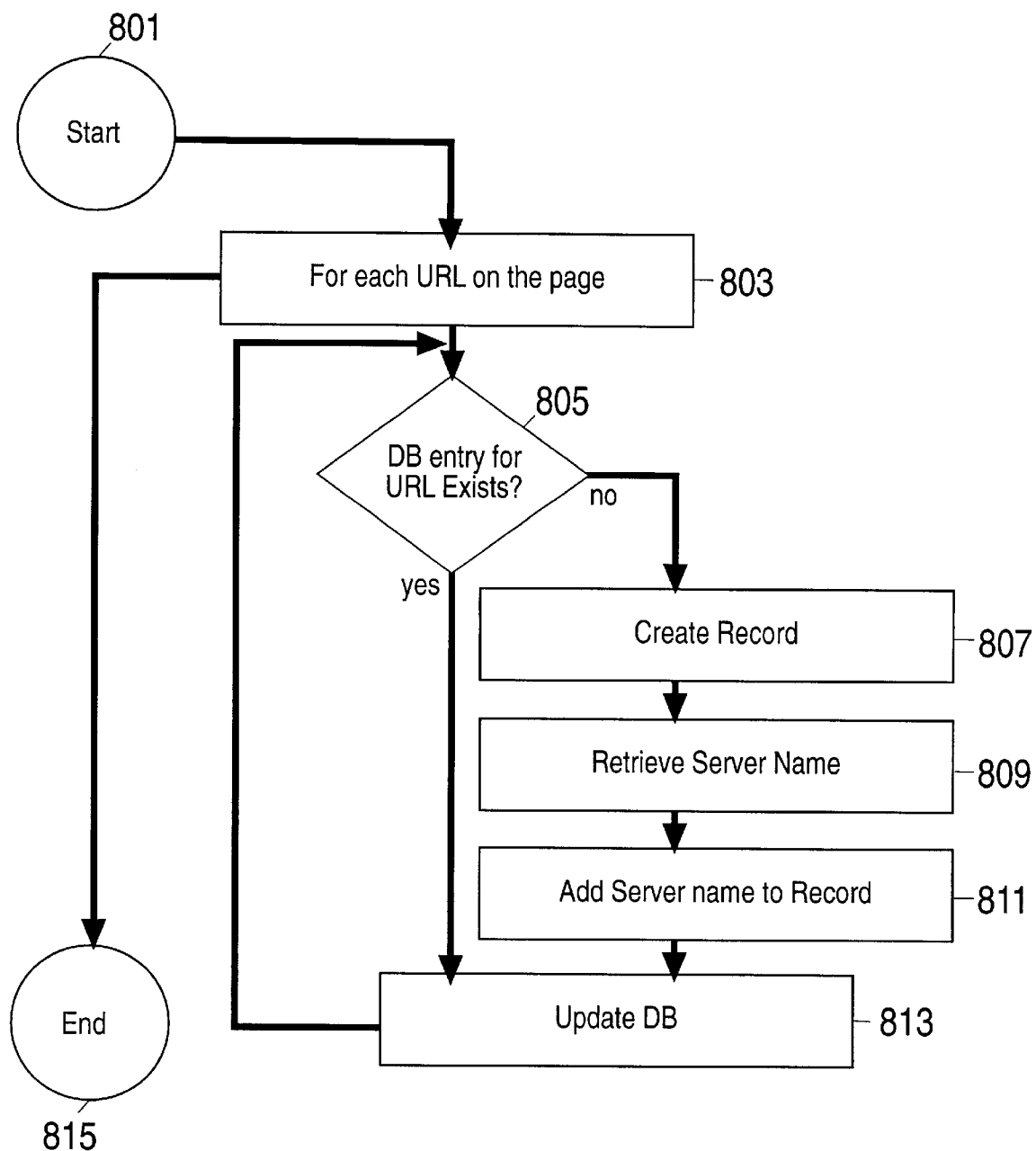
FIG. 8 illustrates the process for obtaining server identification data for URLs contained within a webpage displayed on the world wide web browser in accordance with a preferred embodiment.

FIG. 8 illustrates how this database is used and populated. The process starts 801 after a webpage is downloaded to the WWW browser. Each URL on the webpage is examined 803. If 805 a database record 700 exists containing the URL's server domain name 701, the server's identification data 703 is retrieved from the database and the database Date Shown field 707 is updated appropriately 813. However, if 805 the database does not contain a record matching the server's domain name, the process creates a record 807, retrieves the server's identification data 809, as described above, saves this data in the record 811 and initializes the date fields 705, 707, 709 and adds the record 700 to the database 813. This process occurs for each URL contained in the downloaded webpage. Finally, the process terminates through the terminal labeled 815.

Figure 9:
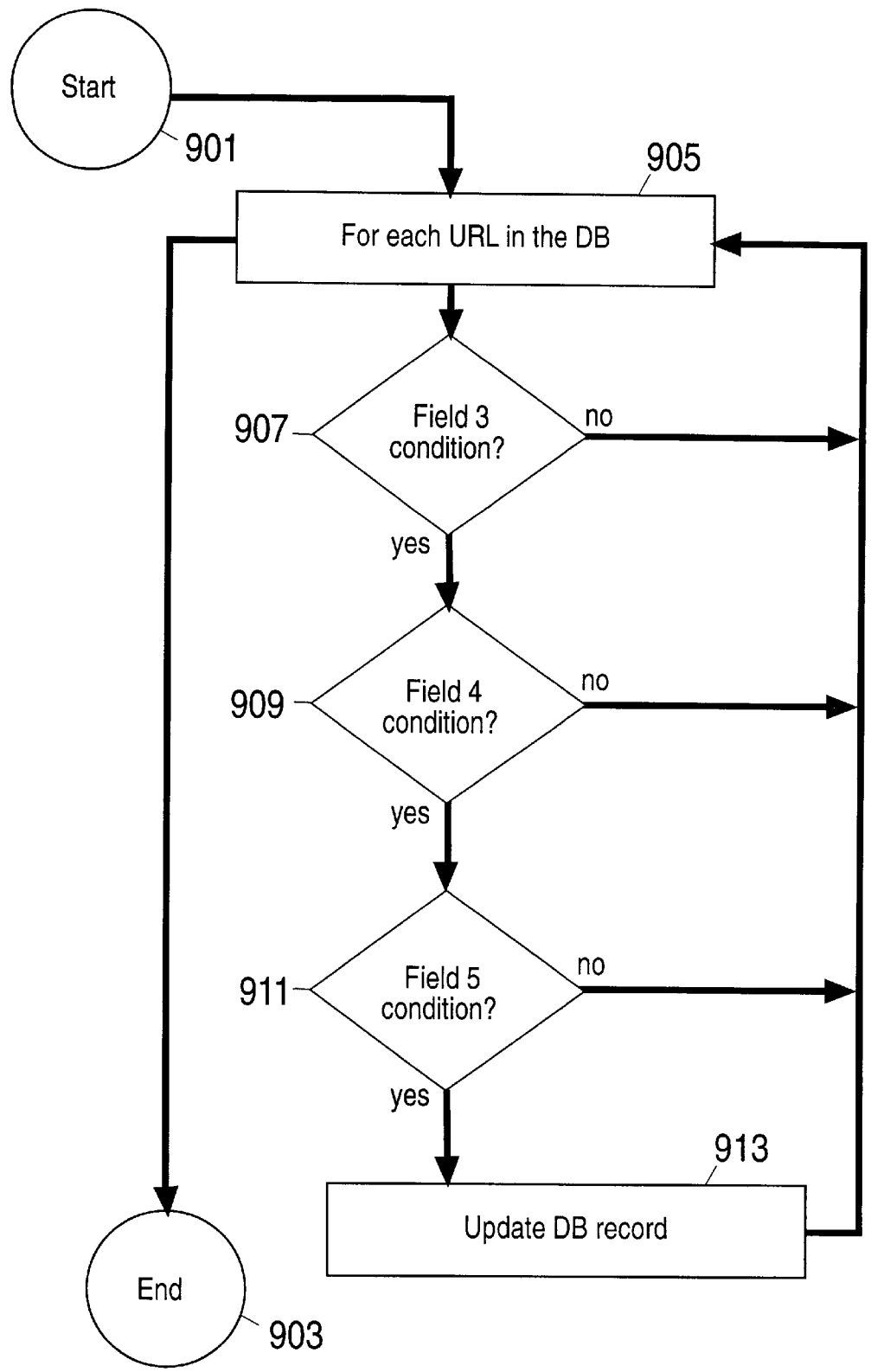
FIG. 9 illustrates the process used to determine whether a record in the database should be updated during a database update operation in accordance with a preferred embodiment.

FIG. 9 illustrates how the database is maintained. This process starts when the WWW browser is in a period of low load. A low load condition in one embodiment of the invention is defined to be when all of the following conditions are met:

no user has provided input for the last 30 minutes;
the computer's CPU utilization is less than 50%;
the local area network's utilization is less than 25%; and
the connection between the local area network and the Internet has a utilization of less than 25%.

One skilled in the art will understand that the above values are site dependent and can be significantly varied while still practicing the invention.

When the computer is in a low load condition, the database update process starts at the terminal labeled 901. Each record 700 in the database is processed 905. When all records 700 in the database are processed, the update process completes through the terminal labeled 903. The first test 907 determines whether the record 700 is old enough to be updated. If 907 the Date Retrieved field 705 of the record is less than one month prior to the current date, the record 700 is not updated and the next record 700 is examined. However, if 907 the Date Retrieved field 705 of the record is one month or more prior to the current date, the update procedure continues.

The next test 909 determines the relevancy of the record 700. That is, if the URL has not been accessed within some period of time, the URL is no longer of interest and the record 700 is not updated. Thus, if 909 the Date Shown field 707 is a week or more prior to the current date the record 700 is not updated and the next record 700 is examined.

However, if the Date Shown field 707 of the record of interest is less than a week prior to the current date the update procedure continues. Furthermore, this test 909 deletes the record 700 if the Date Shown field 707 is more than some number of days prior to the current date. Thus this test 909 also performs a maintenance function on the database. In a preferred embodiment, the record 700 is deleted if the server's identification data has not been displayed within ninety days.

The final test 911 limits the frequency of update attempts for the record 700. If 911 the Date Updated field 709 is a week or less prior to the current date, the record 700 is not updated and the next record 700 is examined. However, if the Date Updated field 709 is more than a week prior to the current date the update process 913 (described below) is initiated.

Figure 10:
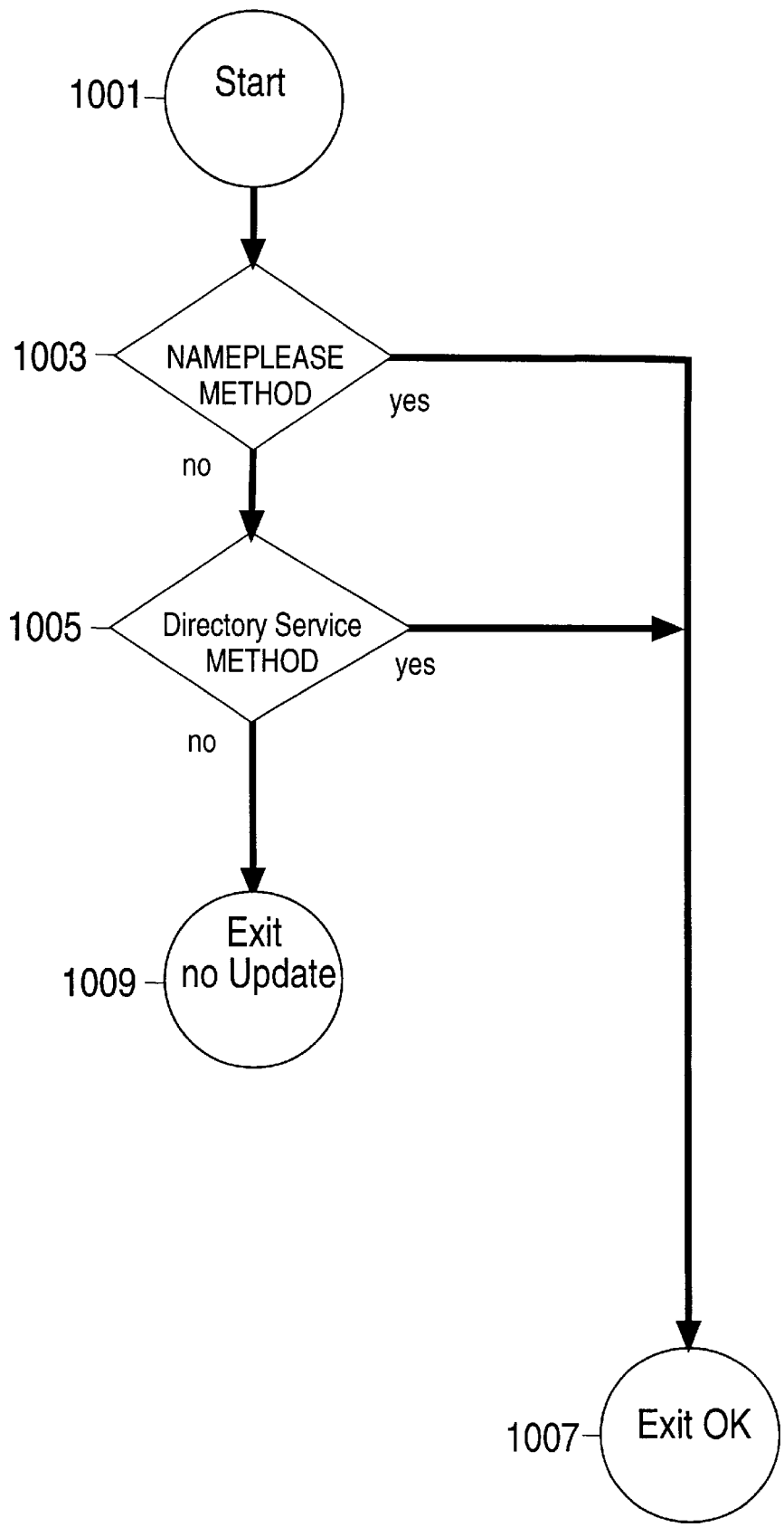
FIG. 10 illustrates the process used to obtain server identification data during a database update operation in accordance with a preferred embodiment.

FIG. 10 illustrates the process used for updating the database records. This process is implemented either within the WWW browser application or in an ancillary application that periodically executes to perform the process. The following describes this function as if it were implemented within the WWW browser. This processes is similar to the one described in FIG. 5. However, there are two major differences 1) only the NAMEPLEASE and the GET methods are used; and 2) the time-out interval is significantly longer. In the preferred embodiment the time-out is set to ten times the time-out used for the process described in FIG. 5. The update process starts at the terminal labeled 1001. The WWW browser first attempts to obtain the server's identification data by sending a NAMEPLEASE HTTP message to the server 1003. Those skilled in the art will recognize that this HTTP message is an extension to existing HTTP facilities. This message consists of the text "NAMEPLEASE" followed by a line terminator. If the WWW server recognizes the message, as described above for FIG. 6, it responds with a success message and the server's identification data. In this situation, the process completes through the successful exit terminal 1007. On the other hand, if the server did not recognize the NAMEPLEASE message or if the WWW server does not respond for some period of time, the WWW browser attempts to obtain the server's identification data by using the well known GET HTTP message method 1005. This method is similar to the process described in FIG. 5. If the server either responds with an error or does not respond within the time-out, the WWW browser exits through the no-update terminal labeled 1009. If this process is implemented using an ancillary application the WWW browser application and the ancillary application must coordinate access to the database. Methods to provide such coordination are well understood by those skilled in the art.

One skilled in the art will understand that the invention as described above teaches a method, apparatus, and computer program product for obtaining and displaying network server information.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. An information access apparatus configured to access information; said information access apparatus having a central processing unit (CPU), a memory, a network interface to provide access to a network and a display device; said information access apparatus utilizing a domain name to access said information existent on said network; said information access apparatus comprising:

an access mechanism configured to obtain server identification data existent on said network and accessible by use of said domain name; said server identification data including descriptive information about a server; and a display mechanism configured to display said server identification data on said display device.

2. The information access apparatus of claim 1 wherein said access mechanism further comprises a network directory access mechanism configured to request a network directory service to return a description; said description selected by said directory service based on said domain name; said description comprising said server identification data.

3. The information access apparatus of claim 2 wherein said network directory access mechanism further comprises a who is utility program.

4. The information access apparatus of claim 1 wherein said access mechanism further comprises:

a query mechanism configured to send a query request to cause said server to send said server identification data to said information access apparatus; and a receiver mechanism configured to receive said server identification data from said server.

5. The information access apparatus of claim 4 wherein said access mechanism further comprises a world wide web (WWW) browser apparatus configured to use a hypertext transfer protocol (HTFP) to effect said query mechanism and said receiver mechanism, said HTTP utilizing a uniform resource locator (URL).

6. The information access apparatus of claim 5 wherein said query request includes a nameplease string.

7. The information access apparatus of claim 5 wherein said query request includes a filename string.

8. The information access apparatus of claim 5 wherein said WWW browser apparatus further comprises a database access mechanism configured to access and maintain a database; said database comprising a record containing said URL and said server identification data.

9. A server apparatus having a central processing unit (CPU), a memory a network interface to provide access to a network, and a filestorage mechanism; said server apparatus responsive to a domain name; said server apparatus configured to provide information over said network; said server apparatus comprising:

a server identification mechanism configured to provide server identification data, said server identification data including descriptive information about said server apparatus.

10. The server apparatus of claim 9 wherein said server identification mechanism further comprises:

a query recognition mechanism configured to recognize a query request for said server identification data; and a response mechanism configured to return said server identification data in response to said query request.

11. The server apparatus of claim 10 wherein said server apparatus further comprises a world wide web (WWW) server apparatus configured to use a hypertext transfer protocol (HTTP) to effect said query recognition mechanism and said response mechanism; said HTTP utilizing a uniform resource locator (URL).

12. The server apparatus of claim 11 wherein said query request includes a nameplease string.

13. The server apparatus of claim 11 wherein said query request includes a filename string.

14. A computer controlled method for displaying information; said method utilizing a domain name to access said information existent on a network; said method comprising the steps of:

a) obtaining server identification data, said server identification data including descriptive information about a server and accessible by use of said domain name; and b) displaying said server identification data on a display device.

15. The computer controlled method of claim 14 wherein the step of obtaining server identification data further comprises the step of requesting a network directory service to return a description; said description selected by said directory service based on said domain name; said description comprising said server identification data.

16. The computer controlled method of claim 15 wherein the step of requesting said network directory service further comprises the step of accessing a who is utility program.

17. The computer controlled method of claim 14 wherein the step of obtaining said server identification data comprises the steps of:

a1) sending a query request to said server;

a2) recognizing said query request by said server;

a3) returning said server identification data from said server in response to said query request; and a4) receiving said server identification data.

18. The computer controlled method of claim 17 wherein the step of obtaining said server identification data further comprises using a hypertext transfer protocol (HTTP) to access said server identification data, said HTTP utilizing a uniform resource locator (URL).

19. The computer controlled method of claim 18 wherein said query request message includes a nameplease string.

20. The computer controlled method of claim 18 wherein said query request message includes a filename string.

21. The computer controlled method of claim 18 wherein the step of obtaining said server identification data further comprises maintaining a database to improve access to said server identification data, said database comprising a record containing said URL and said server identification data.

22. A computer controlled method for providing information over a network using a domain name; said method comprising the step of a server providing server identification data including descriptive information about said server; said server specified by said domain name.

23. The computer controlled method of claim 22 wherein the step of providing said server identification data further comprises the steps of:

a) recognizing a query request for said server identification data; and b) returning said server identification data in response to said query request.

24. The computer controlled method of claim 23 wherein the step of providing said server identification data further comprises the steps of:

processing hypertext transfer protocol (HTTP);

decoding a HTTP request message to recognize said query request; and encoding said server identification data within a HTTP response message; said HTTP utilizing a uniform resource locator (URL).

25. The computer controlled method of claim 24 wherein said query request includes a nameplease string.

26. The computer controlled method of claim 24 wherein said query request includes a filename string.

27. A computer program product comprising:

a computer usable medium having computer readable code embodied therein for causing server identification data to be displayed, said computer program product comprising:

computer readable program code devices configured to cause a computer to effect an information access apparatus configured to access information; said information access apparatus having a central processing unit (CPU), a memory, a network interface to provide access to a network, and a display device; said information access apparatus utilizing a domain name to access said information existent on said network; said computer program product further comprising:

computer readable program code devices configured to cause said computer to effect an access mechanism configured to obtain said server identification data existent on said network and accessible by use of said domain name; said server identification data including descriptive information about a server; and computer readable program code devices configured to cause said computer to effect a display mechanism configured to display said server identification data on said display device.

28. The computer program product of claim 27 wherein said access mechanism further comprises: a network directory access mechanism configured to request a network directory service to return a description; said description selected by said directory service based on said domain name; said description comprising said server identification data.

29. The computer program product of claim 28 wherein said network directory access mechanism further comprises a who is utility program.

30. The computer program product of claim 27 wherein said access mechanism further comprises:

computer readable program code devices configured to cause said computer to effect a query mechanism configured to send a query request to cause said server to send said server identification data to said information access apparatus; and computer readable program code devices configured to cause said computer to effect a receiver mechanism configured to receive said server identification data from said server.

31. The computer program product of claim 30 wherein said information access apparatus further comprises computer readable program code devices configured to cause said computer to effect a world wide web (WWW) browser apparatus configured to use a hypertext transfer protocol (HTTP) to effect said query mechanism and said receiver mechanism, said HTTP utilizing a uniform resource locator (URL).

32. The computer program product according to claim 31 wherein said query request includes a nameplease string.

33. The computer program product according to claim 31 wherein said query request includes a filename string.

34. The computer program product according to claim 31, wherein:

said WWW browser apparatus further comprises computer readable program code devices configured to cause said computer to effect a database access mechanism configured to access and maintain a database; said database comprising a record containing said URL and said server identification data.

35. A computer program product comprising:

a computer usable medium having computer readable code embodied therein for providing server identification data, said computer program product comprising:

computer readable program code devices configured to cause a computer to effect a server apparatus having a central processing unit (CPU), a memory a network interface to provide access to a network, and a filestorage mechanism; said server apparatus responsive to a domain name; said server apparatus configured to provide information over said network; and said server apparatus further comprising computer readable program code devices configured to cause said computer to effect a server identification mechanism configured to provide said server identification data, said server identification data including descriptive information about said server apparatus.

36. The computer program product of claim 35 wherein said server identification mechanism further comprises:

computer readable program code devices configured to cause said computer to effect a query recognition mechanism configured to recognize a query request for said server identification data; and computer readable program code devices configured to cause said computer to effect a response mechanism configured to return said server identification data in response to said query request.

37. The computer program product of claim 36 wherein said server apparatus comprises computer readable program code devices configured to cause said computer to effect a world wide web (WWW) server apparatus configured to use a hypertext transfer protocol (HTTP) to effect said query recognition mechanism and said response mechanism; said HTTP utilizing a uniform resource locator (URL).

38. The computer program product according to claim 37 wherein said query request includes a nameplease string.

39. The computer program product according claim 38 wherein said query request includes a filename string.

* * * * *

UNITED STATES PATENT AND TRADEMARK OFFICE
CERTIFICATE OF CORRECTION

PATENT NO. : 5,925,106
DATED : Jul. 20, 1999
INVENTOR(S) : Nielsen

It is certified that error appears in the above-identified patent and that said Letters Patent is hereby corrected as shown below:

In the Claims, in Claim 1, line 4, after "network" insert comma (,), and in Claim 5, line 4, the acronym in the parenthesis should read HTTP.

Signed and Sealed this

Thirteenth Day of June, 2000

Attest:

Q. TODD DICKINSON

Attesting Officer

Director of Patents and Trademarks